Dec. 19, 1950     L. A. CASANOVA     2,534,899

VAPOR ELECTRIC DEVICE

Filed June 30, 1949

WITNESSES:
Edward Michaels
New L. Groome

INVENTOR
Louis A. Casanova.
BY S. A. Strickler
ATTORNEY

Patented Dec. 19, 1950

2,534,899

UNITED STATES PATENT OFFICE 2,534,899

VAPOR ELECTRIC DEVICE

Louis A. Casanova, Wilkinsburg, Pa., assignor to Westinghouse Electric Corporation, East Pittsburgh, Pa., a corporation of Pennsylvania Application June 30, 1949, Serial No. 102,252

3 Claims. (Cl. 315—250)

My invention relates to a vapor electric device and particularly to a protective means for the reactor excitation circuit of an ignitron type vapor electric valve.

In the operation of vapor electric valves having wave distorting impulsing circuits of the saturable reactor type, it has been found that the voltage generated by the reactor circuit is a function of the resistance of the ignitor, also the power taken by the circuit is a function of the ignitor resistance. Obviously, therefore, if both the ignitors were open circuited the power input to the impulsing circuit would be especially high and limited only by the impedance of the phase shifting reactor and the valve of the firing capacitor of the wave distorting network.

It has been proposed to insert an overcurrent operated switching device in series with the supply to the excitation circuit but in practice this has not been particularly desirable in operation, apparently because the high voltage generated as a result of the open circuit for the ignitor or the high impedance through the ignitor burns out the polarity selective rectox so that the eventual current through the circuit is determined by the low impedance of the broken down rectox.

I have found that by placing a resistor across the output terminals of the reactor excitation circuit or wave distorting network that it will operate in the event of a high impedance connection or open circuit to the ignitor to draw sufficient current to operate the protective circuit breaker and thus prevent damage to the elements of the reactor excitation circuit.

It is accordingly an object of my invention to provide a reactor excitation circuit having means responsive to an inoperative condition of an ignitor to open circuit the supply line to the system.

It is a further object of my invention to provide a load inversely proportional to the operative condition of the ignitors fed by a wave distorter network.

Figure 1:
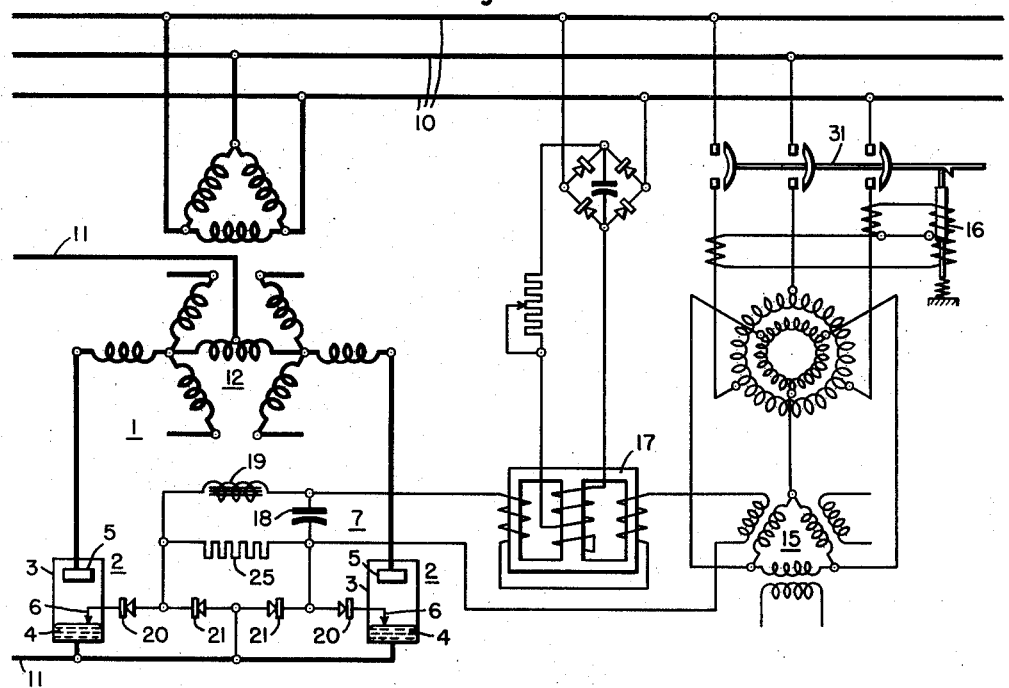
Figure 2:
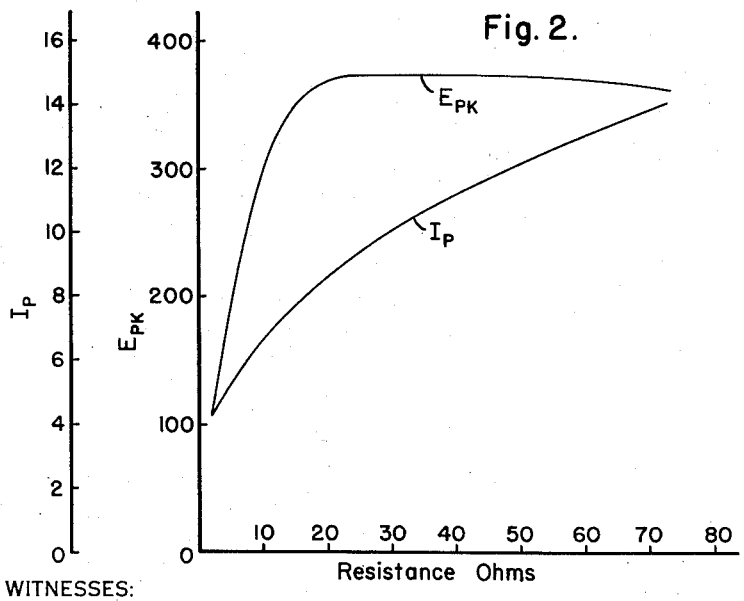

Other objects and advantages of my invention will be apparent from the following detailed description taken in conjunction with the accompanying drawing, in which:

Figure 1 is a schematic illustration of a vapor electric device embodying my invention, and Fig. 2 is a diagrammatic illustration of the current and voltage in a reactor firing system according to my invention.

In the exemplary embodiment of my invention a vapor electric converter 1 having a plurality of pairs of alternately conducting vapor electric devices 2 of the ignitron type carry current between an alternating current circuit 10 and a direct current circuit 11 by means of a connecting rectifier transformer 12. Each of the ignitron valves 2 comprises a sealed container 3 having a vaporizable cathode 4 and a cooperating anode 5. A make-alive or ignitor electrode 6 is placed in contact with the vaporizable cathode 4 and is periodically supplied with actuating potential from a wave distorter excitation network 7 which is supplied with energy from any suitable source such as the alternating current circuit 10.

An excitation transformer 15 is normally provided between the alternating current source 10 and the excitation circuit 7. The connection of the transformer 15 to the source 10 is controlled by means of a switching device 31 which is normally controlled by means of an overcurrent protective system 16 so that on the occurrence of an overcurrent to the transformer 15 the circuit breaker 31 will be tripped opening the circuit.

The wave distorter network 7 itself comprises a phase shifting reactor 17 which also serves as a charging impedance to a firing capacitor 18 which stores sufficient energy so that upon saturation of the control saturable reactor 19 an impulse is delivered to the ignitor electrodes 6. A polarity selective network herein shown as a unidirectional conductor 20 in series relation with each of the make-alive electrodes 6 and a second unidirectional conductor 21 in shunt circuit around each of the make-alive electrodes 6 and its associated series connected unidirectional conductor 20 alternately supplies energy to one or the other of the make-alive electrodes 6 dependent upon the polarity of the impulse generated by the wave distorter network 7.

It has heretofore been found that it for any reason one of the ignitors or make-alive electrodes 6 became inoperative such as from high resistance or open circuit the voltage generated by the wave distorter network 7 frequently breaks down the unidirectional conductors 21 forming the polarity selective network causing high currents to flow in the various elements of the wave distorter network 7, particularly in the phase shifting reactor 17. To control this situation I have provided a load in the form of an impedance, preferably a resistor 25 connected across the output terminals of the wave distorter network 7 and I have found that the high voltage resulting from failure of one or both of the make-alive electrodes 6 causes the load impedance 25 to draw a very high current which in turn energizes the overcurrent protective device 16 and trips the circuit breaker 31, removing the wave distorter network 7 from the circuit.

In actual practice, it has been found desirable in a typical wave distorter system to use a load impedance 25 of the order of 50 ohms. In normal operation of a standard ignitor firing circuit with both ignitors operative, a load impedance 25 of 50 ohms across the terminals of the wave distorter network 7 draws a load of the order of 12½ watts. However, if one of the ignitors 6 should open the loss is increased to approximately 200 watts and if both ignitors are open, the loss is approximately 720 watts.

A typical characteristic of the load output is disclosed in Fig. 2. With both ignitors drawing normal current, the current and voltage drawn from the source 19 of potential is a minimum. The curve $Ip$ then is plotted against the resistance of the load element 25 for various resistances. The curve $Epk$ is the voltage occurring across the terminal of the wave distorter network 7 when one of the ignitors is open. For the same circumstances as for those during which the curve $Ip$ was taken it will thus be seen that the voltage appearing across the terminals of the impedance network rapidly rises to approximately 3½ to 4 times the normal output potential and then levels off so that extremely high potentials will not be sufficient to burn up the elements 21 of the polarity selective network or the elements of the impulsing circuit 7. At the same time the primary current drawn from the supply source rises sufficiently fast to insure operation of the overvoltage protective system 16.

For purposes of illustration I have shown a preferred embodiment of my invention and described the same to the best of my present ability. I desire it to be understood that such description and illustration is exemplary only and that changes and modifications can be made therein without departing from the true spirit of my invention or the scope of the appended claims.

I claim as my invention:

1. An exciting system comprising a wave distorting impulsing system, means including an overcurrent switching device supplying energy to said system, a pair of make-alive electrodes connected to said system, a unidirectional conductor in series with each of said electrodes, a unidirectional conductor in shunt with each electrode and its associated series connected unidirectional conductor, an impedance connected across the terminals of said impulsing system ahead of said unidirectional conductors, said impedance being responsive to failure of one of said make-alive electrodes to actuate said overcurrent breaker.

2. An exciting system comprising a transformer, a wave distorting network fed by said transformer, a pair of exciting electrodes normally connected to said network, polarity responsive means for alternately energizing said exciting electrodes from said network, an overcurrent breaker in series circuit relation to said transformer and a load connected to said wave distorting network ahead of said polarity responsive means, said load being responsive to inoperative condition of at least one exciting electrode to draw a current sufficient to trip said overcurrent breaker.

3. In an exciting system for an ignitron, an impulsing network including a saturable reactor, a transformer connecting said impulsing network to a supply circuit, switching means controlling the flow of power through said transformer, overcurrent means responsive to the current flowing to said impulsing network for tripping said switching means, a pair of exciting electrodes, unidirectional conducting means alternately energizing said electrodes from said network, a resistor connected across the output of said network, said resistor carrying current inversely to the operating condition of said exciting electrodes.

LOUIS A. CASANOVA.

REFERENCES CITED

The following references are of record in the file of this patent:

UNITED STATES PATENTS

| Number | Name | Date |
|---|---|---|
| 2,343,628 | Alexanderson | Mar. 7, 1944 |
| 2,366,544 | Mittag | Jan. 2, 1945 |
| 2,372,104 | Myers | Mar. 20, 1945 |
| 2,426,046 | Pakala | Aug. 19, 1947 |